(12) United States Patent
Sanderson

(10) Patent No.: US 11,227,107 B2
(45) Date of Patent: Jan. 18, 2022

(54) DOCUMENT REVIEWER

(71) Applicant: Kirk T. Sanderson, Hoboken, NJ (US)

(72) Inventor: Kirk T. Sanderson, Hoboken, NJ (US)

( * ) Notice: Subject to any disclaimer, the term of this patent is extended or adjusted under 35 U.S.C. 154(b) by 0 days.

(21) Appl. No.: 16/796,091

(22) Filed: Feb. 20, 2020

(65) Prior Publication Data

US 2020/0272788 A1  Aug. 27, 2020

Related U.S. Application Data

(60) Provisional application No. 62/808,349, filed on Feb. 21, 2019.

(51) Int. Cl.
| | |
|---|---|
| *G06F 40/197* | (2020.01) |
| *G06F 40/169* | (2020.01) |
| *G06F 40/117* | (2020.01) |
| *G06K 9/00* | (2006.01) |
| *G06F 40/194* | (2020.01) |

(52) U.S. Cl.
CPC .......... *G06F 40/197* (2020.01); *G06F 40/117* (2020.01); *G06F 40/169* (2020.01); *G06F 40/194* (2020.01); *G06K 9/00463* (2013.01); *G06K 9/00469* (2013.01)

(58) Field of Classification Search
None
See application file for complete search history.

(56) References Cited

U.S. PATENT DOCUMENTS

| | | | | |
|---|---|---|---|---|
| 6,560,620 | B1* | 5/2003 | Ching | G06F 40/194 |
| | | | | 715/229 |
| 9,069,767 | B1* | 6/2015 | Hamaker | G06F 16/93 |
| 10,430,504 | B1* | 10/2019 | Narayanamurthi | G06F 40/166 |
| 10,733,363 | B1* | 8/2020 | Siegel | G06F 40/103 |
| 2002/0002567 | A1* | 1/2002 | Kanie | G06F 40/143 |
| | | | | 715/234 |
| 2009/0083027 | A1* | 3/2009 | Hollingsworth | G06F 40/284 |
| | | | | 704/9 |

(Continued)

OTHER PUBLICATIONS

Schreibman, S., A. Kumar, and J. McDonald. "The Versioning Machine." Literary & Linguistic Computing 18, No. 1 (2003). (Year: 2003).*

*Primary Examiner* — Frank D Mills
(74) *Attorney, Agent, or Firm* — Lerner, David, Littenberg, Krumholz & Mentlik, LLP

(57) ABSTRACT

A system for displaying a plurality of versions of a document to a user including a computer processor and instructions causing the computer processor to determine a sequential order of the versions, output a base version of the document to a first text box window on a display, compare the base version to a next version on an element-by-element basis, identify common section/subsection headers of the compared versions, associate tags with the section/subsection headers, common sections/subsections of the versions being linked by the tags, output the next version of the document to a new text box window on the display, and replace the base version of the document with the next version of the document. Changes between the base version and the next version may be displayed in the new text box window. The operations may be iteratively performed until all versions have been output to the display.

21 Claims, 11 Drawing Sheets

(56) References Cited

U.S. PATENT DOCUMENTS

| | | | | |
|---|---|---|---|---|
| 2011/0107197 A1* | 5/2011 | DeLuca | ................ | G06F 40/137 |
| | | | | 715/234 |
| 2011/0197121 A1* | 8/2011 | Kletter | ................ | G06F 40/166 |
| | | | | 715/234 |
| 2012/0005156 A1* | 1/2012 | Grant | ................ | G06F 16/1873 |
| | | | | 707/608 |
| 2013/0198596 A1* | 8/2013 | Angelillo | .............. | G06F 40/103 |
| | | | | 715/205 |
| 2015/0012528 A1* | 1/2015 | Kapadia | ............... | G06F 40/169 |
| | | | | 707/722 |
| 2015/0339278 A1* | 11/2015 | Bao | ...................... | G06F 40/194 |
| | | | | 715/229 |
| 2017/0185574 A1* | 6/2017 | Fern | ................... | G06F 3/04842 |

\* cited by examiner

FIGURE 2A

Table of Contents

▶ 1. SALE AND PURCHASE OF THE ACQUIRED INTERESTS
▶ 2. THE CLOSING
▼ 3. REPRESENTATIONS AND WARRANTIES CONCERNING THE COMPANY
  3.01 Organization and Organizational Power
  3.02 Subsidiaries
  3.03 Authorization; No Breach; Valid and Binding Agreement
  3.04 Capitalization
  3.05 Financial Statements
  3.06 Absence of Certain Developments
  3.07 Properties
  3.08 Tax Matters
  3.09 Contracts and Commitments
  3.10 Intellectual Property
  3.11 Litigation
  3.12 Employee Benefit Plans
  3.13 Insurance
  3.14 Compliance with Laws
  3.15 Environmental Matters
  3.16 Affiliated Transactions
  3.17 Labor and Employment Matters
  3.18 Product Warranties; Product Liability; Regulatory Matters
  3.19 Suppliers
  3.20 Customers
  3.21 Bank Accounts; Powers of Attorney
  3.22 Brokerage
  3.23 Other Representations and Warranties
▶ 4. REPRESENTATIONS AND WARRANTIES CONCERNING THE SELLING PARTIES
▶ 5. REPRESENTATIONS AND WARRANTIES OF PURCHASER
▼ 6. INDEMNIFICATION AND

DOCUMENT REVIEWER

CROSS-REFERENCE TO RELATED APPLICATION

The present application claims the benefit of the filing date of U.S. Provisional Patent Application No. 62/808,349 filed Feb. 21, 2019, the disclosure of which is hereby incorporated herein by reference.

BACKGROUND OF THE INVENTION

Negotiating a document, such as a contract or agreement, often involves multiple versions being traded back and forth between opposing parties over a stretch of time. It is currently difficult to track how the document changes over various sequenced versions, and to track which party contributed to the changes. Document comparison tools for comparing two versions of a document against one another are well known. However, these tools do not allow for the comparing and review of multiple versions of a document against a base version of the document, such as an ordered sequence of versions of a document that is being negotiated, at the same time.

Additionally, programs generally support comparison for Tables, Headers, Footers, Moves, Formatting, Case characters, white spaces, and so on. However, comparing these details tends to increase the processing time by a large amount. As a result, if it were desired to compare several documents, it may take up to hours to perform the comparison, which is inefficient. Additionally, this does not get to the root need of understanding the evolution of the previous negotiations in order to make informed edits to a next version of the document.

BRIEF SUMMARY OF THE INVENTION

The present disclosure provides a program that overcomes the challenge of prior version comparison programs in that the program of the present disclosure allows the multiple versions of a given document to be sequentially compared and displayed. In particular, the present disclosure provides for comparison of any given version of the document against a previous version (as compared to, say, an original version), such as the immediately preceding version of the document, and further provides for dynamically generating a text box that displays the differences between the given version and one or more of the previous versions of the document in sequential order. For e.g., simultaneously comparing Document 4 against 3, 3 against 2 and 2 against 1. Additionally, the present disclosure compares the text in the document and excludes the Headers, Footers, Moves, Formatting, Case characters, etc. This decreases the processing time and allows the user to interface with the document using an active and dynamic dashboard.

One aspect of the disclosure is directed to a computer-readable non-transitory storage medium having a program stored thereon as described herein. In one example, the program may be configured to cause a processor to determine a sequential order of the plurality of versions of the document, output a base version of the document to a first text box window on a display of the user, compare the base version of the document to a next version of the document on an element-by-element basis, identify common section headers and common subsection headers of the base and next versions of the document based on the element-by-element comparison, and associate tags with the section headers and subsection headers of the base and next versions of the document with tags. Common sections and common subsections of the base and next versions may be linked by the tags. The program may be configured to cause the processor to further output the next version of the document to a new text box window on the display of the user, whereby changes between the base version and the next version are displayed in the new text box window, and replace the base version of the document with the next version of the document. Each of the compare, identify, associate, output and replace operations may be iteratively performed until all of the plurality of versions of the document have been output to the display of the user, such that there is no limit to the number of nested operations that may be performed.

Another aspect of the disclosure is directed to a system having a computer processor and memory. The memory may have stored thereon the plurality of versions of the document, as well as instructions for causing the computer processor to perform the programs or routines described herein.

BRIEF DESCRIPTION OF THE DRAWINGS

FIG. 2A is a schematic diagram of an example user interface displaying operations of the document review program in accordance with an aspect of the disclosure.

FIGS. 2B-2D are zoomed views of respective portions of the schematic diagram of FIG. 2A.

DETAILED DESCRIPTION

Overview

Figure 1:
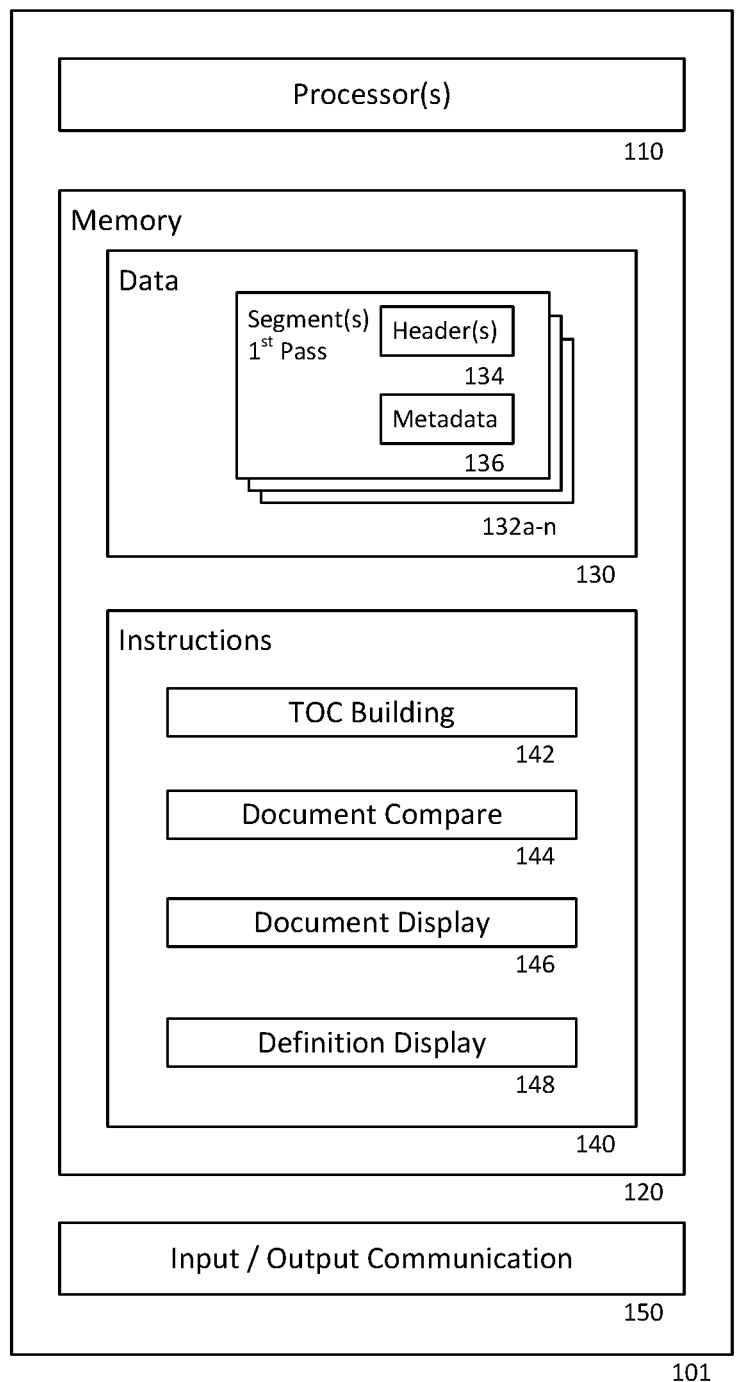
FIG. 1 is a block diagram of an example system for operating a document review program in accordance with an aspect of the present disclosure.

The technology of the present disclosure has several distinctive features that provide an improved user experience for reviewing multiple sequenced versions of a document, such as versions of a contract during negotiation. This allows non-contract professionals to understand, follow, and negotiate contracts along with contract professionals.

One improvement is an active dashboard with multiple document versions (dynamic comparisons), as opposed to the static solutions that only allow for redline comparison between no more than two versions of a document at one time (static or binary comparisons). The program of the present disclosure is capable of automatically truncating Table of Contents sections and corresponding text sections that both parties have already agreed to. For purposes of negotiating a document, the program works on the assumption that if these sections were not challenged by the opposing party in a next version of the document, then it is therefore irrelevant—this leaves the latest uploaded version of the agreement displaying only the remaining relevant data for the user to review. The program still provides for the ability to open up the hidden table of contents and page sections using the mouse. As explained above in connection with the other textboxes, it is also possible to hide unchallenged sections in the Table of Contents textbox.

Another improvement involves the table of contents having a hierarchy algorithm that automatically highlights subsections where changes have occurred, allowing users to click on subsections of interest and auto-scrolling all versions of the document immediately to this same subsection to view comparisons.

As another improvement, the program simultaneously compares across any number of sequenced versions of a document through an interactive dashboard that allows the user to see the progressions of negotiations from each subsequent version to the next. The program allows the user to scroll horizontally across each version in sequence to see how the most recent language has evolved, from start to finish (telling a story). The user processes this information to determine the edits of the next version of a negotiated agreement. The program's auto-alignment technology further allows the user to click on the table of contents or on any paragraph (in any textbox) on the dashboard to cause all other versions of the document to line up with the same sections or subsections, allowing each version to be viewed across the same paragraph without ever leaving their spot in the document.

Another improvement involves definition pop-up balloons to further mitigate the scrolling of documents. By hovering over a definition (or reference section), the dashboard opens a window to read respective definitions. As text inside of these balloons may have other definitions, the program further opens balloons outside of those balloons, without limit. When the user has absorbed the necessary information from the balloons, the user can click outside of the balloons to immediately clear the definition boxes and return to an unobstructed view of the document without ever leaving the dashboard.

Example System

FIG. 1 is a block diagram of a system 100. The system 100 may include one or more computing devices 101 for operating a document review program. The one or more computing devices may include, individually or collectively, a processor 110, memory 120 having programmed thereon data 130 and instructions 140, and one or more communication interfaces 150 for receiving inputs, transmitting outputs, or both.

The processor 110 may be hardware that performs one or more operations. The processor 110 may be any standard processor, such as a central processing unit (CPU), or may be a dedicated processor, such as an application-specific integrated circuit (ASIC) or a field programmable gate array (FPGA). While one processor block is shown, the system 100 may also include multiple processors in or distributed among the one or more computing devices 101, which may or may not operate in parallel.

The memory 120 may be of any type capable of storing information accessible by the processor, such as a hard-drive, ROM, RAM, CD-ROM, DVD, Blu-Ray disk, flash memories, write-capable or read-only memories. Although the processor 110 and memory 120 are functionally illustrated in FIG. 1 as being within the same computing device 101 block, it will be understood that the processor and memory may actually comprise multiple processors and memories that may or may not be stored within the same physical housing or location. For example, some or all of the instructions and data may be stored on a computer-readable removable recording medium such as a CD-ROM, DVD or Blu-Ray disk. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel.

The data 130 may be retrieved, stored or otherwise modified by processor 110. The data may be stored as a collection of data. For instance, although the invention is not limited by any particular data structure, the data 130 may be stored in computer registers, in a relational database as a table having a plurality of different fields and records, XML documents, or flat files. The data may also be formatted in any computer readable format such as, but not limited to, binary values, ASCII etc. Similarly, the data may include images stored in a variety of formats. Moreover, the data may include any information sufficient to identify the relevant information, such as descriptive text, proprietary codes, pointers, references to data stored in other memories (including other locations in a network) or information which is used by a function to calculate the relevant data.

The instructions 140 may comprise any set of instructions to be executed directly (such as machine code) or indirectly (such as scripts) by the processor. such as to retrieve, store, or otherwise modify the data 130. In that regard, the terms "instructions," "applications" and "programs" are used interchangeably herein. The instructions may be stored in any computer language or format, such as in executable/object code or modules of source code.

In addition, the instructions 140 may include one or more applications or programs adapted to provide any of the functions described with respect to the computing device 101 and in accordance with the various aspects of the disclosure discussed herein. Each application or program may include and execute specific instructions, typically under management of the processor 110 in conjunction with an operating system and networking protocols instructions to provide the functionality described herein.

The communication interfaces may include one or more user inputs such as a keyboard and mouse and/or other types of input devices such as pen-inputs, joysticks, buttons, touch screens, etc., and one or more outputs, such as an image generated at a display, audio outputted at a speaker, etc.

In the example of the present disclosure, the data 130 may include one or more document versions 132a-132n, each document version having its own respective data, such as header data 134, as well as other metadata 136 for performing the various operations and routines described herein. It should be understood that each "version" of a given document may be stored as its own file. In this regard, each "version" of a given document may be its own electronic document. Alternatively, versions of the document may begin as separate electronic documents, but upon uploading may be stored in a common file with other versions of the same document.

The instructions 140 may include one or more programs for generating an image of the one or more document versions 132a-132n, as well as images of other information related to the data 130. Such programs may include, by way of example, one or more table of contents building routines 142, document compare routines 144, document display routines 146, and definition display routines 148. Some or all of the routines may further be capable of operating at the same time, which is to say that the display of the one or more computing devices 101 may be capable of generating an output based on one routine at a same time that an output of another routine is generated on the same display. Furthermore, the present disclosure provides ways of generating these multiple outputs in a fashion that is comprehensible, and thus beneficial, to a user of the display.

Figure 2A:
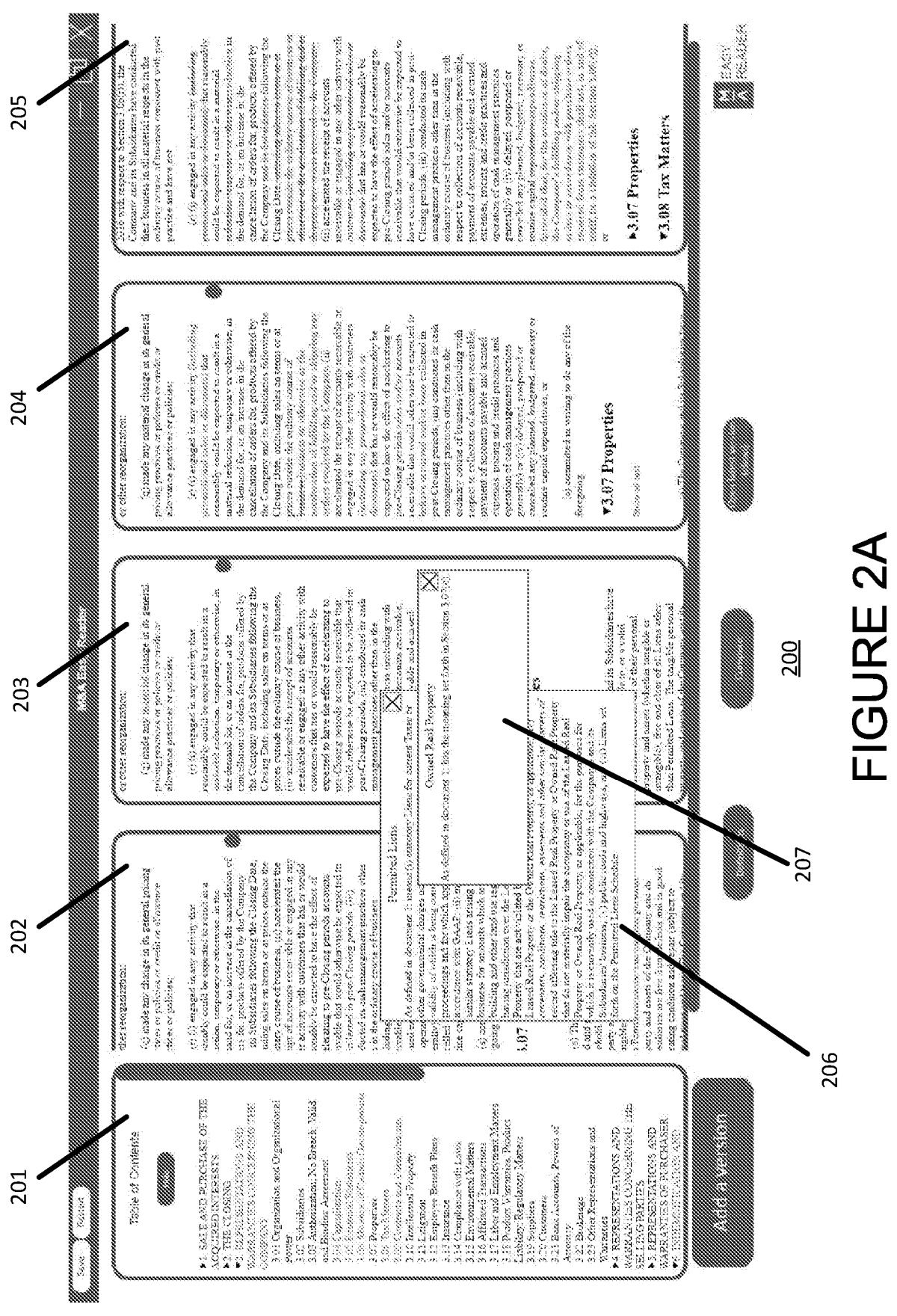

FIG. 2A is a schematic diagram of an example graphical user interface (GUI) 200. For the sake of clarity, zoomed portions of the GUI 200 are shown in greater detail in each of FIGS. 2B-2D. It should be understood that the GUI presented to the user is that of FIG. 2A, but that the text shown in FIGS. 2B-2D would be clear to the user when viewing the GUI of FIG. 2A.

The GUI in the example of FIG. 2A shows a display of a computer program executed by a processor of one or more computing devices based on instructions stored in memory of the one or more computing devices, such as that of the system 100 shown in FIG. 1. Those skilled in the art will appreciate that the memory may be hardware integrated with the processor or may be remote from the processor, such as over a network connection (e.g., the Internet). Furthermore, it should be appreciated that the instructions and the data accessed by the instructions (e.g., versions of the documents) may be stored together or distributed across a network. Additionally, the GUI may be displayed on a monitor or display of a user of the program, and further that the computer processor and memory may be integrated with or remote from the monitor.

As shown in FIGS. 2A-2D, the GUI 200 may display a plurality of textboxes. One textbox 201 may include a Table of Contents associated with the text of the remaining textboxes 202-205. Each of the other textboxes 202-205 may include a respective version of a document. Text content of an uploaded version of the document may be pasted into the textbox when the version is uploaded. Each subsequent version of the document may include the same text as a previous version of the document, except for changes made to the document in the subsequent version (compared to the previous version), changes may include added text, deleted text, moved text, and so on. The changes in text may be shown in the GUI using any one or more markings as known in the art, such as underline for additions, strikethrough for deletions, double underline or bracketing for moved text, and so on.

In the example of FIGS. 2A-2D, the textboxes 201-205 are presented in a line moving from left to right. In particular, the Table of Contents textbox 201 is shown as a left-most textbox on the line. The versions of the document 202-205 are presented in time order according to metadata included in each version. The metadata may include time information such as a creation date, a most recent edit date, and so on. Alternatively or additionally, the metadata may include an originating document, whereby, each document is linked to the previous document from which is was created in order to enable ordering the versions of the document according to the originating document information (e.g., version 205 was created from a copy of version 204, which was created from a copy of version 203, which was created from a copy of version 202). Presenting the versions of the document along a single line as shown may help to make interpreting changes to the document over time more intuitive to the user.

The GUI 200 may further display additional textboxes 206, 207. The additional textboxes may include additional information concerning the text of the displayed documents or document versions. For example, an additional textbox may include a definition of a term appearing in a textbox. To illustrate, definition textbox 206 displays a definition of the term "Permitted Liens," which appears in a first version of Section 3.07 of the displayed document, as can be seen in textbox 202. To further illustrate, definition textbox 207 displays a definition of the term "Owned Real Property," which appears in the definition of "Permitted Liens" in definition textbox 206.

Figure 2C:
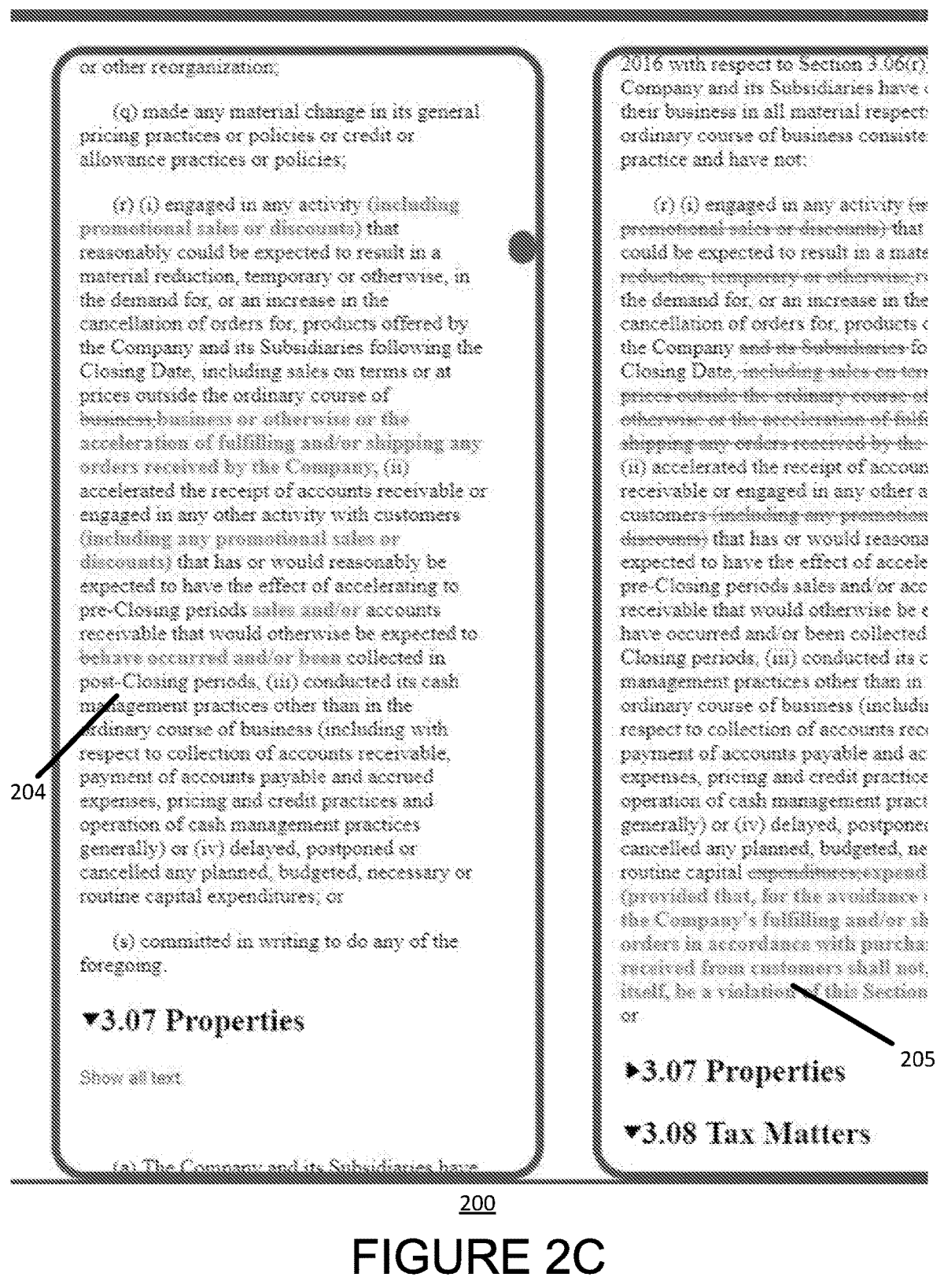
Figure 2D:
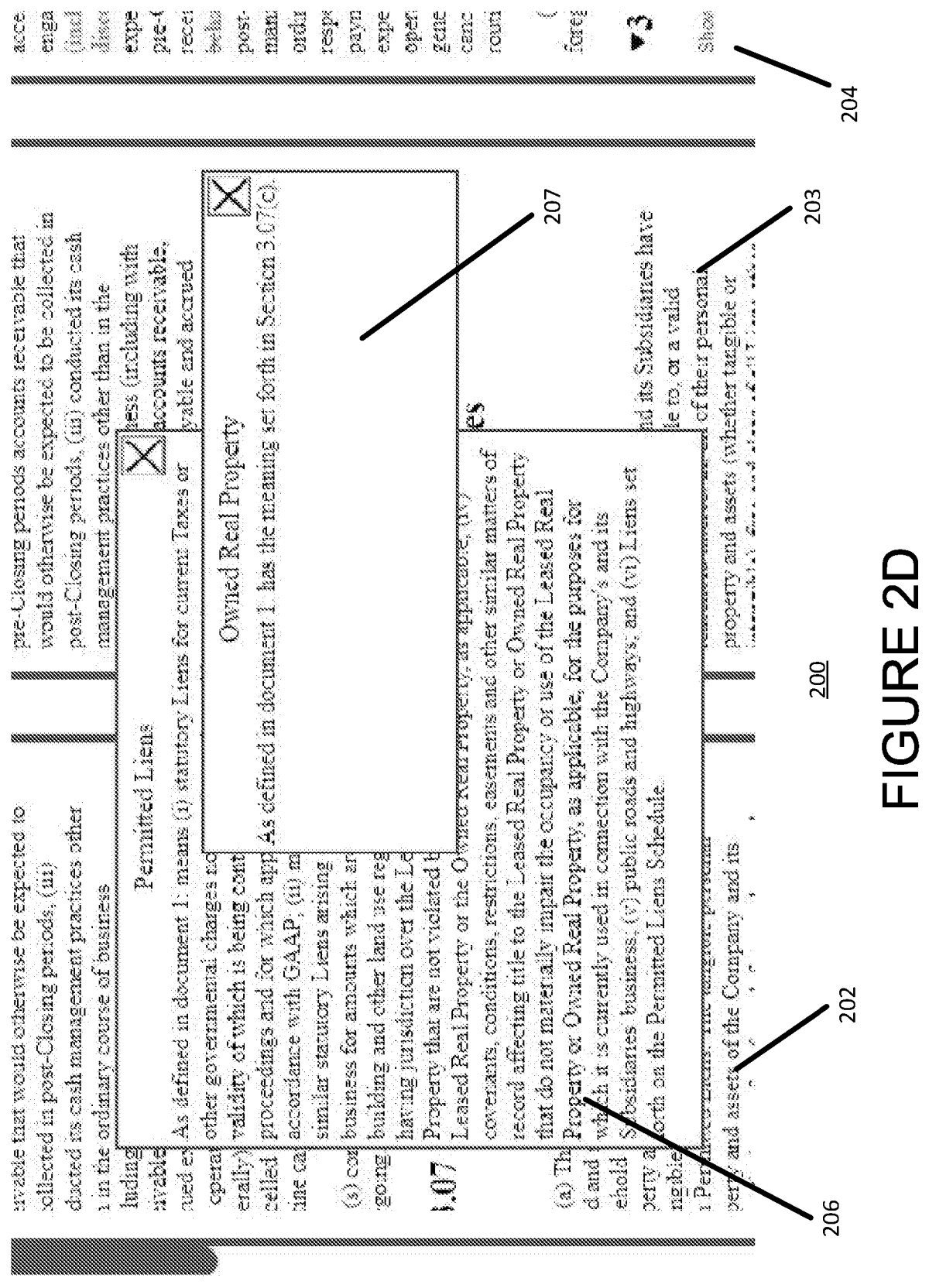

In the example of FIG. 2A, and shown in greater detail in FIG. 2D, the program is configured to display a given definition textbox at a determined size and a determined position. The determined size may include a predetermined width and a variable height. The variable height may be a minimum height for which the entire definition of the defined term can fit within the textbox. In some instances such as the example of definition textbox 207, the variable height may be at least a minimum height, even if less space is needed to fit the definition. Additionally, the determined position may be at a position for which a given corner of the definition textbox (e.g., in FIG. 2D, the bottom left-hand corner) is positioned on top of a central portion of the term in the queried document (in the example of FIG. 2D, the queries document for definition textbox 206 is textbox 202, and for definition textbox 207 is definition textbox 206).

As can be seen from the example of FIG. 2, definition textboxes may be nested, and there need not be any limit to the number of definition textboxes that can be nested within each other iteratively. Additionally, definition textboxes may be closed out individually (whereby closing definition textbox 206 does not necessarily also close out definition textbox 207).

Also in the example GUI 200 of FIG. 2A, and shown in greater detail in FIG. 2B, the Table of Contents 201 may include marked headings 211. The headings may be marked using color, underlining, brackets, and so on. In the example of FIG. 2B, each of the headings for Section 3 and Subsections 3.4, 3.5, 3.6, 3.8 and 3.9, as well as Section 6, are marked. Marking a heading may indicate that changes have been made to text under that particular heading between at least two versions of the document.

Also in the example GUI 200 of FIG. 2A, and shown in greater detail in FIG. 2C, each of the textboxes may display the text of only the sections including changes, whereas other sections of the document for which no changes are made may be hidden from view. For example, in each of textboxes 203-205, the text associated with section 3.07 is hidden from view. This may make it easier for a user to review the changes among different versions of the documents by not having to scroll through ranges of text having no changes at all. As a default, text of the marked headings and subheadings of the Table of Contents may be shown in the other textboxes, whereas text of the other headings and subheadings that are not marked may be hidden from view. Methods and routines for hiding and showing text are described in greater detail below.

The GUI may further include any one or combination of several features, which may be presented in the GUI as various buttons. Some example features are described below:

Save: this feature allows for a current project to be saved. The current project may include each of the documents uploaded and manually labelled documents at such time.

Open Project: this feature allows for multiple documents to be opened together if they are labeled as belonging to a common project, as opposed to being uploaded to the program one at a time.

In some examples, the "Save" button may be presented in the GUI as an "Open Project" button when the program is first started, thus allowing a previously saved collection of documents, such as the most recently saved collection of documents, to be opened immediately. For example, an existing project may have been saved with twenty-one versions, opened, had version twenty-two added to it, then saved and closed. Then, the next time the project is opened, there will be twenty-two versions of the document included in the file comparison.

Search: this feature allows for any specific word/phrase to be searched in all of the uploaded documents/versions. To iterate to the next search term, the user may click the "Search" button again. When it reaches the last occurred word/phrase, it may display a message "No more occurrences."

Add to Favorite: this feature may be used to add a searched word/phrase into the textbox area and to assign a tag to the added word. This may also save the location/index of the occurrence of the word in all the documents. After adding a word or phrase to favorite, if the user clicks on that word or phrase, the program may position each of the documents in the frame/textbox to display that word (similar to the "Search" feature). For instance, when the user clicks on the "Add to Favorite" button, the word present in the Search Bar at the time of the clicking may be added to the saved word/phrases frame. Also, if the user selects (e.g., right-clicks) on any section in Table of Contents, it may be added to this frame as well. If user selects (e.g., clicks) on any of the saved words, all the textboxes/documents to the right may navigate to the occurrences of that word. If there are multiple occurrences, every click will find the next occurrence of the word.

Restart: this feature may be used to restart the program without saving any current state of the application. This may be provided to help the user restart the program in order to upload a different project or set of documents. Additionally or alternatively, this may be provided to help the user restart the application during application crash/bug.

Table of Contents: a Table of Contents of an uploaded document may be presented in a text box. When multiple documents of a project, such as different versions of the same document, are shown at the same time, the program may be configured to display the Table of Contents of the latest version of the documents. This allows for easy navigation. As described in greater detail herein, every section/subsection in the Table of Contents may be associated with a tag. The tag may respond in various preset ways to user interactions. For example, if a user left-clicks on the section/subsection shown in the Table of Contents, in a separate text box, or both, all the documents on the right may navigate to that section/subsection.

For further example, if the user middle-clicks the section/subsection shown in the Table of Contents, in a separate textbox, or both, this may cause the text associated with the selected section/subsection to be hidden from view in all of the open textboxes showing the text of the document (e.g., textboxes 201-205) or in all the documents in the textboxes to the right of the textbox in which the section/subsection is selected. For example, in the example of FIGS. 2C and 2D, it can be seen that the text included in Section 3.07 is shown in textbox 202 but is not shown any of the textboxes 203-205 to the right of textbox 202. This may be the result of a user middle-clicking on the "Section 3.07" subheading in textbox 202. By contrast, had the user clicked on the "Section 3.07" subheading in the Table of Contents textbox 201, this may have resulted in the text of Section 3.07 being hidden from view in all of textboxes 202-205, and not only in textboxes 203-205.

For further example, if a user right-clicks on a section/subsection, it may add that section/subsection to each of the textboxes shown in the GUI, or to the textbox in which the user clicked and each of the textboxes to the right. For further example, by default, if there is no redline between the versions of the document, e.g., if the section is same in all the versions, the program may automatically hide that section in the document textbox, then a right-click response may add that section to the Add to Favorite frame which the user can click for easy navigation of all document textbox to that section.

Hide: this feature may be used to hide text in the textboxes, such as hiding text of those sections and subsections for which no changes were made. In some examples, a default setting may be to show all text in each textbox, whereby clicking on the "Hide Article" button may cause some text to be hidden. In other examples, the default may be to hide text. Clicking on the "Hide Article" when text is hidden may result in the hidden text being revealed. Additionally, in some examples, an icon of the "Hide Article" button may change depending on whether text is or is not currently being hidden so that the user can quickly and easily know whether text is hidden.

Add Version: this feature may be used to add a new textbox to the GUI 200. In some examples, adding a new version may automatically add the version to the far right of the display. In other examples, adding the new version may involve ordering the new version according to its metadata, whereby if a middle version of the document is added to the program after a later version of the document is added, the middle version of the document will still appear in the middle of the line of versions instead of at the end of the line.

Compare: this feature may be used to display changes between the different versions of the uploaded document. For example, the textboxes 202-205 of the GUI may as a default include text but without any changes tracked, such that clicking on the "Compare" button causes the changes to be shown, such as by underlining, strikethrough, etc.

Open Latest Version: this feature allows the user to open the latest version of the uploaded file/document directly from the application. This file may be opened with the program the user has specified as the default editing software on their device. This allows the user to open the latest version of the document for any new changes that the user wants to make in the next version of the document.

Hide: this feature may be used to hide a textbox including a full version of the document. The "Compare" function may then be performed without the hidden version of the document. Rerunning the "Compare" function may be automatic, such as in response to a user performing the "Hide" feature on one or more textboxes, or manual, such as in response to a user selecting the "Compare" button after hiding one or more textboxes. For example, and with reference to FIGS. 2A-2D, a user may wish to view changes between the document version shown in textbox 202 and the document version shown in textbox 204. This may be accomplished by first hiding textbox 203, and then automatically or manually performing the "Compare" function. For further example, viewing collective changes between a first version and a final version of a document may involve hiding all textboxes for intermediate versions of the textbox.

Show all text: this feature may be used to reveal the text hidden in a given textbox. This allows the user to get a complete view of the section in a given textbox. This button can be pressed once to reveal all text, and pressed again to hide the unchanged elements once more, restoring the textbox to showing only sections and subsections having changes.

Label: this feature may be used to manually enter labels or names for each separate textbox 202-205 containing the text of the reviewed document. When the user saves the project, the label names entered by the user may also be saved, and may be retrieved when reopening the project.

Definition: this feature opens another window which contains all the definitions as it is in the document. Most uploaded documents refer to Definitions commonly used throughout the document for easy reference. Hence, these documents have a section called "Definitions" which explains all these terms. Thus, the "Definition" button extracts the Definition Section from the latest uploaded document which serves the purpose of easy referencing in a separate window to avoid the user having to leave the current spot in the document.

Edit: this feature allows the user to open the latest uploaded file/document directly from the application. When the user uploads the document, a list may be created which appends the path for every uploaded document. Then, when the user clicks the "Edit" button, the latest path may be extracted from the list and that file is executed directly from the application. This may be done through win32com. Further, this may allow the user to open the latest document in order for any changes to be made in the document.

In some examples, it may not be possible to show all textboxes within a frame of the display of the user at one time. A horizontal scroll bar may be provided to scroll horizontally through the textboxes in order for the user to review all of the uploaded versions of the document.

Additionally, a document is often very long, and all of the text of the document cannot be displayed at one time. A vertical scroll bar may be provided to scroll through the text of the textbox vertically, so that user can review the full content of a given version of the document by scrolling vertically.

Example Routines

The following routines and subroutines may be executed by the program in order to achieve the features shown in the above-noted GUI. These routines may be stored in the aforesaid memory and executed by the aforesaid computer processor having access to the memory. Additionally, the order of the steps described in the routines is merely an example, as certain steps may in other examples be performed in a different order or simultaneously. Additionally, in some examples, steps may be omitted, other steps may be added, or both.

Figure 3:
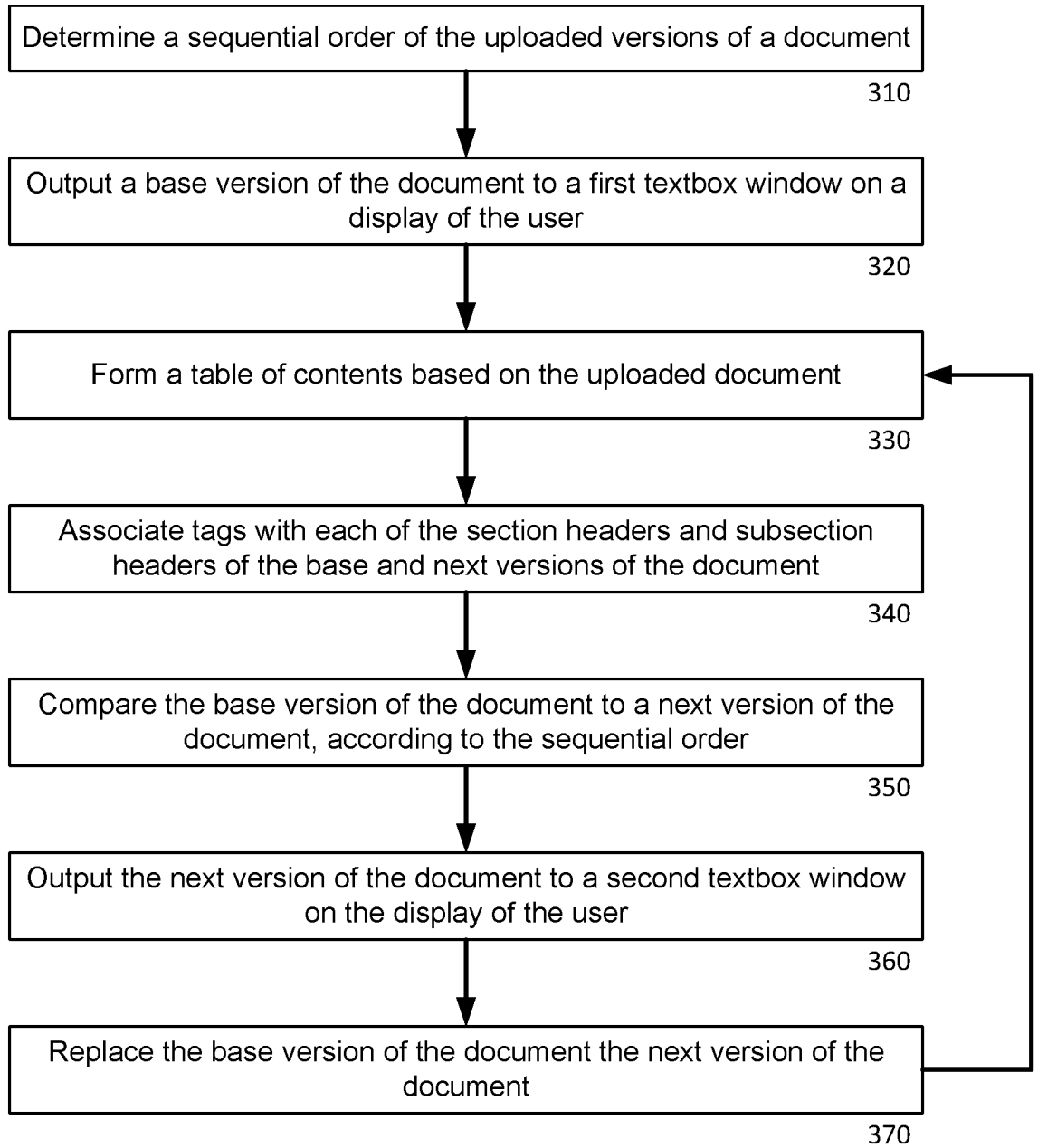
FIG. 3 is a flow diagram of an example upload and comparison program in accordance with an aspect of the disclosure.

FIG. 3 is a flow diagram of a routine 300 that is executed by a processor (such as processor 110 of the system 100 of FIG. 1) to operate an upload and comparison program in accordance with the present disclosure.

At block 310, a sequential order of the uploaded versions of a document is determined. The sequential order may be determined based on a time of upload or based on metadata, such as a last time edited, a time created, or a originating document up each uploaded document.

At block 320, a base version of the document is output to a first textbox window on a display of the user. The program may begin the display operation by extracting text and styles from the uploaded version of the document, and converting the extracted text and styles to HTML code, such as by using a mammoth library, so that the text may be properly displayed.

At block 330, a table of contents may be formed based on the uploaded document. For example, in the case of an uploaded document having formatting, heading of the document may be identified based on the formatting and may be extracted based on the identifications. The formatting may be used to separate articles, headings and subheadings. For instance, a "Heading 1" in xmls format may be assigned as the Articles of the document in the Table of Contents, a "Heading 2" in xmls format may be assigned as Sections, and a "Heading 3" in xmls format may be assigned as Subsections.

At block 340, tags are associated with each of the section headers and subsection headers of the base and next versions of the document. The tags may cause common sections and common subsections of the base and next versions to become linked to one another.

At block 350, the base version of the document is compared to a next version of the document, according to the sequential order. The comparison may be performed on an element-by-element basis. In this regard, an "element" of the document may in some examples be defined as a string of characters broken up by certain predefined characters, such as whitespaces, commas, periods, and so on. In other examples, each character may be considered its own element, such that comparison is performed on a character by character basis. Additionally, in some examples, a heading (as possibly defined by styles of the uploaded document) may be defined as a single element, whereby a change to even one character in the heading may cause the heading to be interpreted as a completely new heading.

At block 360, the next version of the document is output to a second textbox window on the display of the user. Operations for outputting the second textbox may be similar to those for outputting the first textbox. Positioning the second textbox may be based on a position of the first textbox, such as by positioning the second textbox immediately to the right of the first textbox, or spaced apart by a predetermine amount. Changes between the base version and the next version may be displayed in the second textbox window.

In some examples, outputting the second textbox may further involve determining for which of sections and subsections of the next version changed were identified in block 350. Then, at block 360, the text from only those sections and subsections having changes may be shown in the second textbox, while the text from other sections and subsections having no changes from the base version may be hidden from sight.

At block 370, the base version of the document is replaced with the next version of the document. In other words, the routine 300 marks the next version of the document as the base version, so that any subsequently uploaded version of the document may be compared against it and not against the originally uploaded version. Each of the compare, identify, associate, output and replace operations of blocks 330, 340, 350, and 360 may then be repeated and iteratively performed for all versions of the document, until all of the versions have been output to the display of the user.

Figure 4:
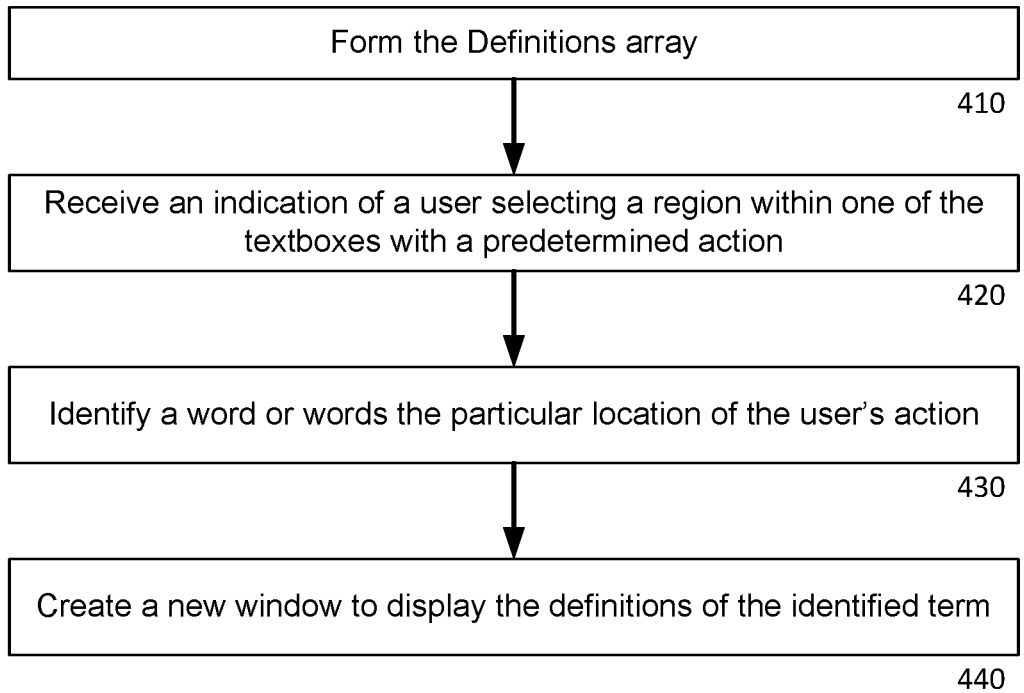
FIG. 4 is a flow diagram of an example definition storing program in accordance with an aspect of the disclosure.

FIG. 4 is a flow diagram of a routine 400 that is executed by a processor (such as processor 110 of the system 100 of FIG. 1) to operate a definitions program in accordance with the present disclosure.

At block 410, a Definitions array may be formed. Forming the definitions array may be based on a review of at least one and at most all versions of the uploaded document. Most uploaded include one or more section titled "Definitions" or including the word "Definitions" in its title. Forming a definitions array may first involve identifying those sections and subsections, and then based on formatting present in those sections, extracting the terms that are defined in each section or subsection and associating each term with its definition found in the section or subsection. The defined terms and definitions, once extracted, may be stored in a temporary memory of the computing device, such as until the program is closed or reset.

At block 420, the processor may receive an indication of a user selecting a region within one of the textboxes with a predetermined action, such as a left-click. For instance, when the user hovers over the textbox, the mouse location may be captured and the word closest to the mouse location may be extracted. The indication may indicate the particular location of the user's action (such as a position of the mouse) relative to the text displayed on the display.

At block 430, a word or words the particular location of the user's action is identified. If the hovered word is part of any defined term, the program may begin an algorithm to find which defined term is being hovered. This algorithm will be used to avoid displaying the wrong definition. For example, if the user were to hover their mouse over the first word in the phrase "Tax Returns," the program must know to display the definition for "Tax Returns" and not the definition for "Tax." The program may achieve this by, if the hovered word is a part of more than one defined terms, reading the words around it in order to determine which specific term the user wants. For example, if the user hovers the word "Tax" in the sentence " . . . and Tax Returns . . . ," and Tax and Tax Returns both have definitions, the program will check if "and Tax" is a term, and then if "Tax Returns" is a term. It will recursively add words from either side until it find the longest possible term with a definition, then create a pop-up displaying that term. This way, even when hovering "Tax" in "Tax Returns," the program will know to show the definition for "Tax Returns," at which point it will create a tooltip and paste the definition into it.

At block 440, a new window may be created to display the definitions of the identified term.

Figure 5:
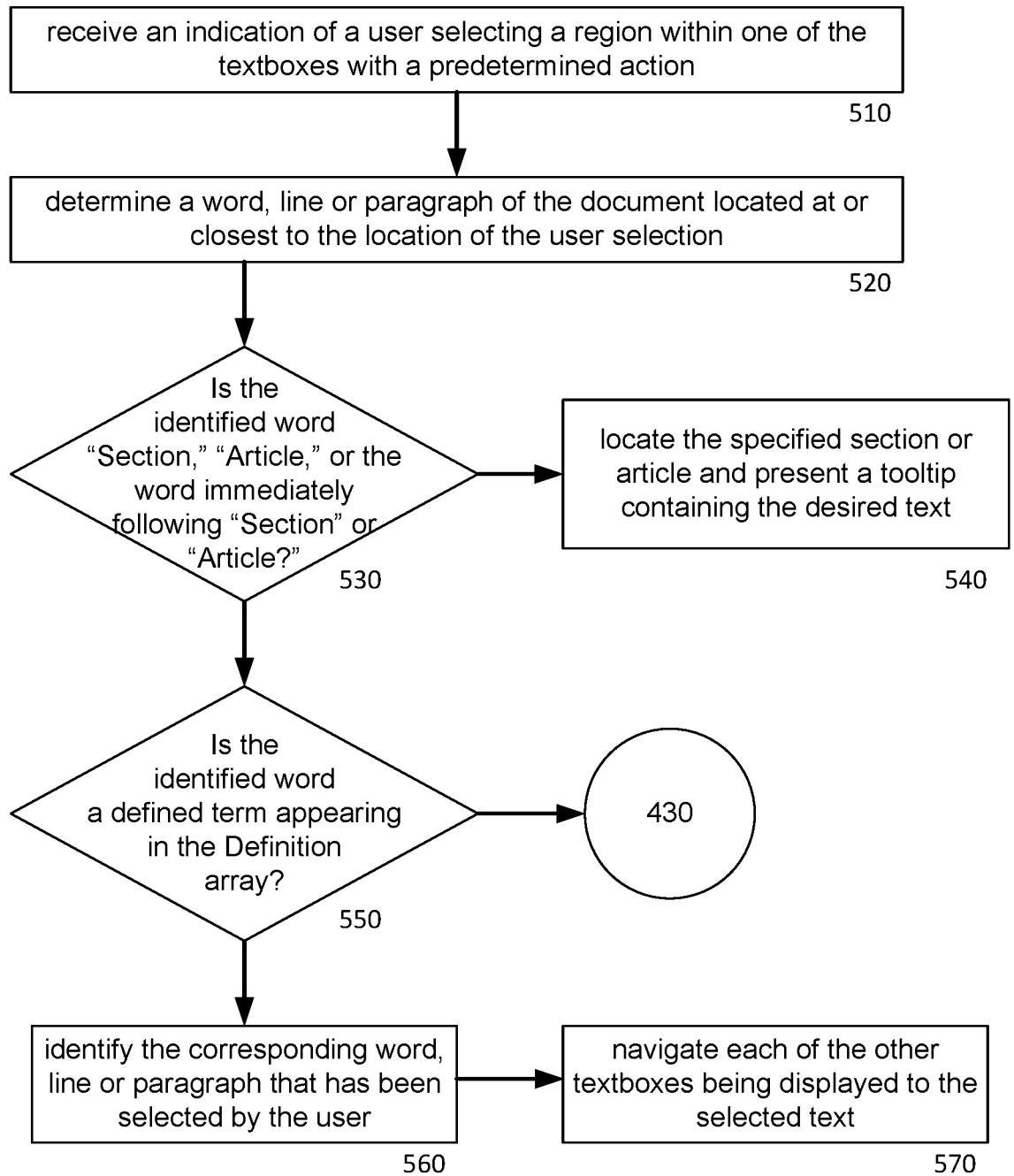
FIG. 5 is a flow diagram of an example document navigation program in accordance with an aspect of the disclosure.

FIG. 5 is a flow diagram of a routine 500 that is executed by a processor (such as processor 110 of the system 100 of FIG. 1) to operate a document navigation program in accordance with the present disclosure At block 510, the processor may receive an indication of a user selecting a region within one of the textboxes with a predetermined action, such as a left-click of the user's mouse. The indication may further indicate the particular location of the user's action (such as a position of the mouse).

At block 520, the processor may determine a word, line or paragraph of the document located at or closest to the location of the user selection (e.g., the mouse location).

At block 530, the processor may determine whether the identified word is "Section," "Article," or the word immediately following the word "Section" or "Article." If yes, operations may proceed to block 540. At block 540, the program may execute code to locate the specified section or article and present a tooltip containing the desired text. For example, if a word in the phrase "Section 5.4(b)(iii)" is selected, the program may search for and copy the text from the specified "Section 5.4(b)(iii)." Then, using the Table of Contents, the program may navigate to the Section in the document and extract the text in that section. Once extracted, the text may be pasted into a tooltip, which is then displayed to user just besides the mouse location.

The tooltip may be a new textbox, similar to the new textboxes created for definitions. Additionally, the tooltip may include a button for navigating the extracted text in the remaining textboxes. For instance, if the user presses the button, this may cause the program to navigate the document to the specified section.

Additionally or alternatively, if the tooltip text/extracted text contains another Section reference, for example the phrase "due diligence is defined in Section 6.2(k)," the user may hover their mouse on either word in the phrase "Section 6.2(k)" in order to open a new tooltip. Like with the nested textboxes of the definition operations, hovering on a section reference in the tooltip to access that reference can be done repeatedly without limit.

If the hovered word is neither "Article", "Section", nor a word immediately following "Article" or "Section", then operations may proceed to block 550, in which the processor determines whether the hovered-over word is a defined term appearing in the Definition array. If yes, operations may proceed with block 430 of routine 400 for displaying a definition of the hovered-over word. In other words, the program may check the hovered word against the Definition array.

Otherwise, if the selected word does not have a definition in the Definition array, operations may terminate. Alternatively, at block 560, the processor may identify the corresponding word, line or paragraph that has been selected by the user. Then at block 570, the program may navigate each of the other textboxes being displayed to the selected text.

Figure 6:
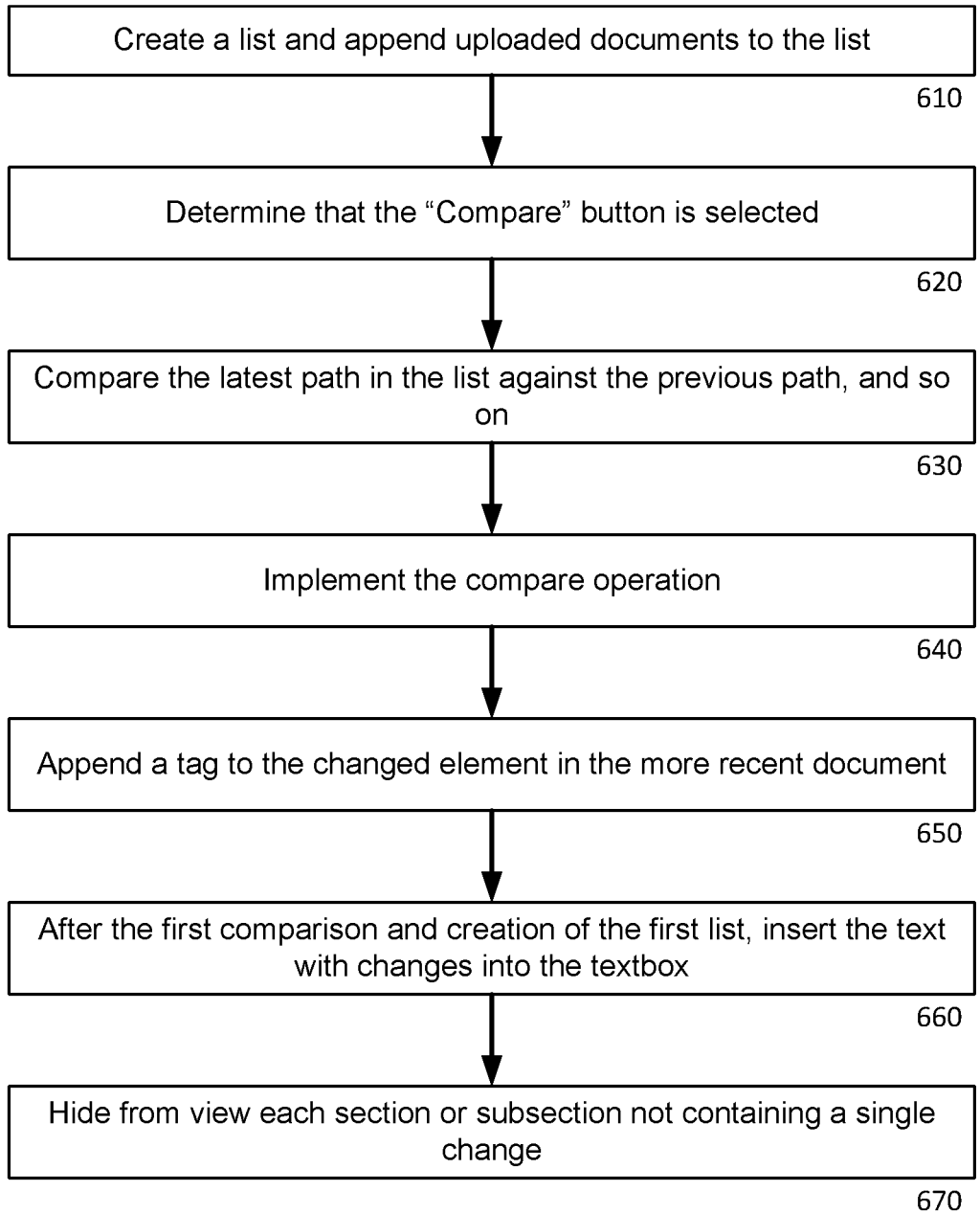
FIG. 6 is a flow diagram of another example compare program in accordance with an aspect of the disclosure.

FIG. 6 is a flow diagram of a routine 600 that is executed by a processor (such as processor 110 of the system 100 of FIG. 1) to operate a compare program in accordance with the present disclosure.

At block 610, when the user uploads the documents, a list is created, and the path of every uploaded document is appended to the list.

At block 620, it is determined that the user selects the "Compare" button, such as clicking on the button. In response, at block 630, the latest path in the list may be compared against the previous path and so on, e.g., textbox 205 to 204, 204 to 203, 203 to 202.

At block 640, the comparison/redline may be implemented with a specific process flow. Two documents may be compared against one another at a time. The documents may be compared element by element, using the node-htmldiff package. Furthermore, if the user uploads "n" documents, the program may create a loop which runs "n" number of times. In the first run, the program may paste document 1 in a first textbox 10. Then, in the second run/loop, the program may compare the document 2 against document 1. The comparisons may then be pasted into a second textbox 10. In the third run/loop, the program may compare the document 3 against document 2, and so on.

At block 650, if it is determined that the two compared documents have a difference, the program may append a tag to the changed element in the more recent document (e.g., textbox 204, if textboxes 203 and 204 are being compared). For example, during comparison, if the version in textbox 204 has any specific word/phrase deleted when comparing with the version in textbox 203, the program may append a 'del' tag and the missing phrase/word to the version in textbox 204. The program may then append an 'ins' if there is any addition of word/phrase to the change. This may be done for all the sections and for every previous document comparison.

At block 660, after the first comparison (e.g., textboxes 203 and 204) and creation of the first list, the textbox may insert the Document text. While inserting, the program may check for the 'ins' and 'del' tags. If the program finds 'del', then the corresponding text may be pasted and the text may be formatted using a first format (e.g., red color, strikethrough, etc.). If it finds 'ins', it formats the text into a second format (e.g., bold, green color). This helps in identifying the text if it was deleted in the previous version or was it added in the previous version or was it the same.

At block 670, each section or subsection not containing a single change is hidden from view. As a result, the user may see only those sections/topics open which have differences. If the section/topic have no differences, the user does not need to focus on it and can give more importance to those sections which are changing progressively. For example, if a document has 30 sections/topics, and 25 of them have no redlines, it becomes inefficient for the user to scroll through all 30 sections just to find those 5 which have redlined. The program makes it possible for the user to focus just on those 5 sections/topics with redline. If by any chance, the user wishes to refer to any previously closed section/topic, the section can still be opened and the user can even close the section back again after reviewing.

Figure 7:
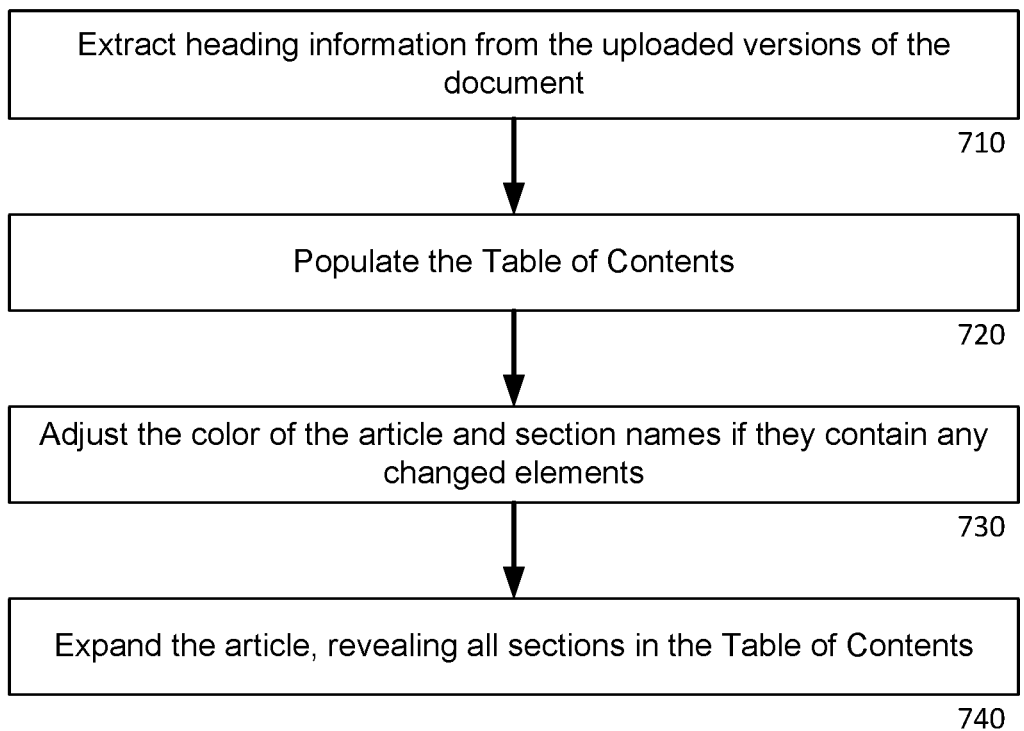
FIG. 7 is a flow diagram of an example table of contents population program in accordance with an aspect of the disclosure.

FIG. 7 is a flow diagram of a routine 700 that is executed by a processor (such as processor 110 of the system 100 of FIG. 1) to operate a Table of Contents population program in accordance with the present disclosure.

At block 710, the program may extract heading information from the uploaded versions of the document. Different headings may have different formatting, such as the "Heading 1," "Heading 2," and "Heading 3" formatting used in many word processing programs.

At block 720, the program may populate the Table of Contents by copying the "Heading 1" and "Heading 2" and so on styled paragraphs from the latest version of the document. For example, if 5 versions of a document are uploaded, the Table of Contents may be created from the heading information contained in the fifth document in the sequence.

Optionally, at block 730 the program may adjust the color of the article and section names if they contain any changed elements.

If an article contains any changes, at block 740, the "Hide" button may adjust to expand the article, revealing all sections in the Table of Contents. The section or sections containing changes may also be marked in the Table of Contents, such as by using a different color or font, indicating changes have been made within. As a result, the user may see only those sections/topics open which have differences. If the section/topic have no differences, the user does not need to focus on it and can give more importance to those sections which are changing progressively. For example, if as document has 30 sections/topics, and 25 of them have no redlines, it becomes inefficient for user to scroll through all 30 sections just to find those 5 which have redlined. The program makes it possible for the user to focus just on those 5 sections/topics with redline. If by any chance, the user wishes to refer to any previously closed section/topic, the section can still be opened and the user can even close the section back again after reviewing.

Figure 8:
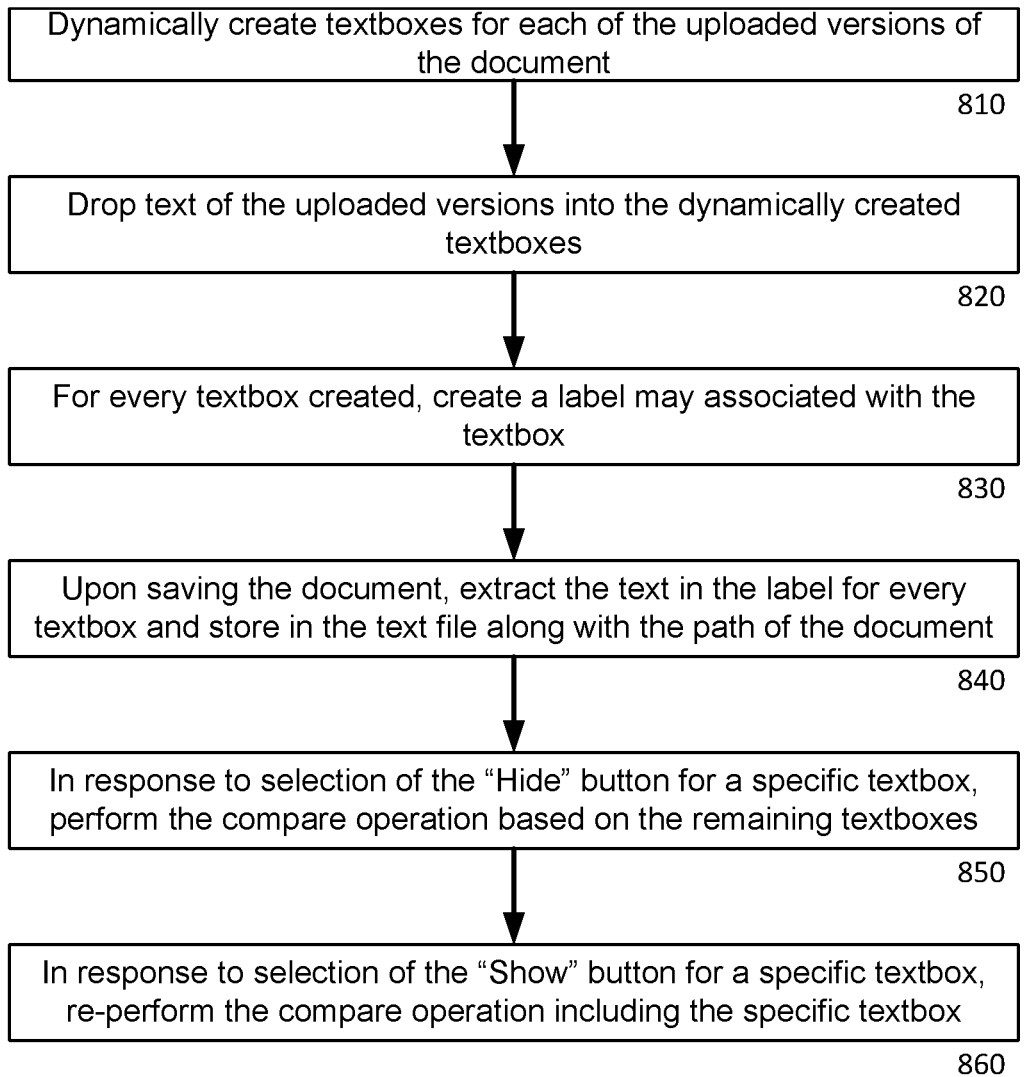
FIG. 8 is a flow diagram of an example version labeling and text hide/show program in accordance with an aspect of the disclosure.

FIG. 8 is a flow diagram of a routine 700 that is executed by a processor (such as processor 110 of the system 100 of FIG. 1) to operate version labelling and document hiding/showing in accordance with the present disclosure.

At block 810, when a user uploads the documents or an existing project, textboxes may be created dynamically depending on the number of documents. At block 820, the compared documents may be placed into the dynamically created textboxes.

At block 830, for every textbox created, a label may also be created above the textbox. The label may contain the uploaded filename by default. The user can manually name the textbox/document by changing the label name. Each textbox may also contain a 'Hide' button underneath the label to manually hide the textbox.

At block 840, in response to a user saving the project, the text in the label may also be extracted for every textbox and stored in the text file along with the path of the document. Then, when the user opens the project, the program may determine the saved label from the file and if determined, paste the label name to the corresponding textbox. This provides an ability to save and retain the label name.

Another feature included in the program is the Hide/Show button. Every textbox may contain the uploaded version of the document and the comparison may be done between the version against its previous uploaded version. In every run, a textbox may be created to paste the redline text. Along with the textbox, a label and Hide/Show button may also be created. The Hide/Show button may be used to either hide that textbox that includes the specific version or show that textbox once hidden.

At block 850, in response to the user clicking the "Hide" button of a specific textbox, the compare operation (e.g., blocks 640, 650, 660 and 670 of routine 600) will be rerun based on the textboxes that remain present on the user's display. In other words, if textbox 203 is minimized, textbox 204 may be updated to show the insertion and deletion changes between textboxes 202 and 204.

Clicking the "Hide" button may also cause the "Hide" button to change to a "Show" button. Then, at block 860, in response to the user clicking the "Show" button, the compare operation may be rerun to include the previously hidden document. In this manner, the user can actively select the specific documents they wish to compare.

It should be understood that the example user controls (e.g., left-clicking, middle-clicking, right-clicking, etc.) may be swapped or otherwise interchanged with one another, or replaced with other user-based commands, such as keyboard commands, touchscreen commands, and any other user inputs generally known in the art.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for displaying a plurality of versions of a document to a user, the plurality of versions including a base version and two or more edited versions, the system comprising:
   a computer processor; and
   memory having stored thereon the plurality of versions of the document and instructions for causing the computer processor to:
   determine a sequential order of the plurality of versions of the document;
   output the base version of the document to a first text box window on a display of the user,
   compare the base version of the document to a next version of the document on an element-by-element basis, wherein the base and next versions of the document have common section headers and common subsection headers;

associate tags with the section headers and subsection headers of the base and next versions of the document with tags, wherein common sections and common subsections of the base and next versions are linked by the tags;

output the next version of the document to a new text box window on the display of the user, wherein changes between the base version and the next version are displayed in the new text box window, and wherein the new text box window is positioned horizontally adjacent to the base version and wherein the first text box window and the new text box window are arranged to be horizontally scrollable;

replace the base version of the document with the next version of the document, wherein each of the compare, associate, output and replace operations are iteratively performed until all of the plurality of versions of the document have been output to the display of the user in sequence horizontally to one another;

receive a user input corresponding to a tag indicating a selected section or subsection of the document;

for each of the plurality of versions of the document, identifying a section or subsection associated with the tag of the received user input; and automatically horizontally lining up each of the identified sections or subsections of the plurality of versions of the document on the display, whereby common sections or subsections linked by the tag of the received user input are horizontally aligned with one another on the display.

2. The system of claim 1, wherein the instructions further cause the computer processor to display the text box windows of the plurality of versions of the document according to the sequential order.

3. The system of claim 1, wherein the instructions further cause the computer processor to, for a given version of the document, hide sections and subsections of the document that do not include changes from being displayed in the text box window.

4. The system of claim 3, wherein the instructions further cause the computer processor to:
assign a number to the text of the next version before each change in the document; and
determine the sections and subsections of the document that do not include changes based on a presence or absence of assigned numbers in the text.

5. The system of claim 4, wherein a first assigned tag indicates deletion of text, and wherein a second assigned tag indicates insertion of text.

6. The system of claim 3, wherein the instructions further cause the computer processor to, in response to a user input, show a hidden section or subsection of the document in the text box window.

7. The system of claim 1, wherein the instructions further cause the computer processor to extract the section headers and the subsection headers from each of the base version and the next version of the document.

8. The system of claim 7, wherein the section headers and the subsection headers are xmls-format headings.

9. The system of claim 1, wherein the instructions further cause the computer processor to, in response to a user selecting a section header or subsection header in one displayed text box window, navigate each of the displayed text box windows to the linked section header or subsection header.

10. The system of claim 1, wherein the instructions further cause the computer processor to:

index text of the document referring to a section header or subsection header; and in response to a user selecting an indexed text of the document, displaying an additional new text box window containing text of the section header or subsection header referred to by the indexed text.

11. The system of claim 1, wherein the instructions further cause the computer processor to, in response to a second user input to change the versions of the document shown on the display:
change the horizontally aligned text box windows shown on the display in accordance with the second user input; and
automatically update the text box windows so that each displayed next version of the document shows changes between the displayed next version and a displayed previous version of the document positioned horizontally adjacent to the displayed next version.

12. A computer-readable non-transitory storage medium having programmed thereon instructions for causing a computer processor to:
determine a sequential order of a plurality of versions of a document, the plurality of versions including a base version and two or more edited versions;
output the base version of the document to a first text box window on a display of a user,
compare the base version of the document to a next version of the document on an element-by-element basis, wherein the base and next versions of the document have common section headers and common subsection headers;
associate tags with the section headers and subsection headers of the base and next versions of the document with tags, wherein common sections and common subsections of the base and next versions are linked by the tags;
output the next version of the document to a new text box window on the display of a user, wherein changes between the base version and the next version are displayed in the new text box window, and wherein the new text box window is positioned horizontally adjacent to the base version and wherein the first text box window and the new text box window are arranged to be horizontally scrollable; and
replace the base version of the document with the next version of the document,
wherein each of the compare, associate, output and replace operations are iteratively performed until all of the plurality of versions of the document have been output to the display of the user in sequence horizontally to one another,
receive a user input corresponding to a tag indicating a selected section or subsection of the document;
for each of the plurality of versions of the document, identifying a section or subsection associated with the tag of the received user input; and
automatically horizontally lining up each of the identified sections or subsections of the plurality of versions of the document on the display, whereby common sections or subsections linked by the tag of the received user input are horizontally aligned with one another on the display.

13. The storage medium of claim 12, wherein the instructions further cause the computer processor to display the text box windows of the plurality of versions of the document according to the sequential order.

14. The storage medium of claim 12, wherein the instructions further cause the computer processor to, for a given version of the document, hide sections and subsections of the document that do not include changes from being displayed in the text box window.

15. The storage medium of claim 14, wherein the instructions further cause the computer processor to:
assign a tag to the text of the next version before each change in the document; and
determine the sections and subsections of the document that do not include changes based on a presence or absence of assigned tags in the text.

16. The storage medium of claim 15, wherein a first assigned tag indicates deletion of text, and wherein a second assigned tag indicates insertion of text.

17. The storage medium of claim 14, wherein the instructions further cause the computer processor to, in response to a user input, show a hidden section or subsection of the document in the text box window.

18. The storage medium of claim 12, wherein the instructions further cause the computer processor to extract the section headers and the subsection headers from each of the base version and the next version of the document.

19. The storage medium of claim 18, wherein the section headers and the subsection headers are xmls-format headings.

20. The storage medium of claim 12, wherein the instructions further cause the computer processor to, in response to a user selecting a section header or subsection header in one displayed text box window, navigate each of the displayed text box windows to the linked section header or subsection header.

21. The storage medium of claim 12, wherein the instructions further cause the computer processor to:
index text of the document referring to a section header or subsection header; and
in response to a user selecting an indexed text of the document, displaying an additional new text box window containing text of the section header or subsection header referred to by the indexed text.

\* \* \* \* \*